Patented Jan. 26, 1954

2,667,431

UNITED STATES PATENT OFFICE 2,667,431

METHOD OF METALLIZING CERAMICS

Don G. Burnside, Princeton, N. J., assignor to Radio Corporation of America, a corporation of Delaware No Drawing. Application October 30, 1950, Serial No. 193,040

5 Claims. (Cl. 117—120)

The present invention relates to improvements in metal coatings for ceramic materials. More particularly, the invention relates to an improved metallic coating material which can be applied to a ceramic surface by the seizure method.

It has previously been known to apply metallic coatings to glass and other ceramics by various methods such as vapor deposition, application of a fired-on paste, and chemical deposition. The first of these methods is an expensive process usually requiring a vacuum chamber. The second is applicable mainly to the high cost noble metals, such as gold, silver, and platinum. The third requires careful cleaning of the base material and is applicable to only a few metals with much success.

In addition, it has also been known to decorate glass and other ceramics by the seizure method; that is, by effecting relative frictional movement between a ceramic material and a piece of a particular metal. As the metal is drawn over the surface of the ceramic, or vice versa, a thin film of the metal is rubbed off and adheres to the ceramic firmly. Since this method can be carried out with simple apparatus and great rapidity, it lends itself to mass production of articles at low cost.

Some metals previously deposited on ceramic surfaces by this method have been zirconium, titanium, columbium, and the like. Although these metals have the advantage that they are refractory and, therefore, can be soldered at high temperatures without melting, they suffer the disadvantages of being difficult to apply with continuity and smoothness on a ceramic surface. They also do not lend themselves to soldering or electroplating other metals thereover as well as could be desired, even when applied from their most ductile forms.

It has also been known to apply some of the softer metals, such as cadmium or aluminum, to ceramic surfaces by the seizure method. Although these can be applied satisfactorily without causing surface scratches, they are unsuited for certain applications such as the manufacture of electron tubes because they are unable to withstand the high temperatures commonly employed in the tube making industry for fabrication.

It has now been found that, using alloys consisting essentially of certain critical percentages of certain refractory metals and a softer metal, smooth, even coatings of the metal may be applied to ceramic surfaces by the seizure method. These coatings are capable of withstanding relatively high temperatures and have other properties making them of particular value in the electronics industry.

More particularly, the present invention is directed to an improved process of applying a coating of metal to a ceramic surface by the seizure method, in which the essential improvement is the use of particular alloys consisting essentially of 70–80% by weight copper and 30–20% of a metal from the class consisting of titanium and zirconium. Also a part of the invention are the improved products comprising ceramic materials coated with the above-mentioned alloys.

One object of the invention is to provide improved metal coated ceramic materials.

Another object of the invention is to provide improved metal coated ceramic materials in which the coating is resistant to relatively high temperatures.

Another object of the invention is to provide ceramic articles having an improved metallic coating capable of being soldered at relatively high temperatures.

Still another object of the invention is to provide an improved method of metallizing a surface of a ceramic article.

A typical example of preparation of articles included in the present invention will now be given.

Example

A bar was cast of a metal alloy consisting essentially of 28% titanium and 72% copper. A hollow glass cylinder, to the outer surface of which it was desired to apply a heat-resistant metal coating, was set up on a lathe and rotated rapidly. As the cylinder rotated, the bar of alloy was held against the glass surface, causing a film of metal to be deposited thereon. The bar was moved slowly along the length of the cylinder at a constant speed until a smooth, even coating of metal was deposited over the entire surface which it was desired to metallize. The coating was found to be very adherent; it could not be rubbed off. Furthermore, there was no loss of adherence when the coated article was heated in a vacuum to 850° C. The coating was also found to serve as an excellent base on which to electro-deposit other metals, such as copper, and could also be soldered readily at high temperatures.

It has been found that the percentage composition of the alloy can be varied somewhat without causing much deterioration of the properties of the coating. For example, the alloy may consist essentially of from 20 to 30% titanium and 80 to 70% copper. Zirconium may also be substituted in whole or in part for the titanium.

It is not possible, however, to obtain satisfactory coatings if the percentages of the metallic ingredients of the alloy are substantially outside the above range. Alloys of lower zirconium or titanium content than 20% were tried but were found to be increasingly unsatisfactory as content of refractory metal was lowered. Alloys in which the percentage of refractory metal is too high are, of course, subject to about the same disadvantages as listed above for the pure metals, themselves.

Ceramics other than glass may be metallized with results equally as good as those obtained with glass. Examples of other ceramics are silica ware, glazed pottery, zircon porcelain, steatite, forsterite, and the like. The alloy may be used either for decorative purposes, or to provide electrically conductive coatings on the surfaces of ceramic capacitors or other electrical or electronic components.

I claim as my invention:

1. A method of making a smooth, even, adherent metal coated ceramic article comprising bringing a solid body of an alloy, consisting essentially of 70 to 80% by weight copper and 30 to 20% by weight of a metal from the class consisting of titanium and zirconium, into physical contact with a surface of said article and effecting relative movement between said surface and said body, thereby causing a film of the alloy to be deposited adherently on said surface.

2. A method according to claim 1 in which said ceramic is glass.

3. A method according to claim 1 in which said alloy consists essentially of 72% copper and 28% titanium.

4. A method according to claim 1 in which said alloy consists essentially of copper and titanium.

5. A method according to claim 1 in which said alloy consists essentially of copper and zirconium.

DON G. BURNSIDE.

References Cited in the file of this patent

UNITED STATES PATENTS

| Number | Name | Date |
|---|---|---|
| 2,292,026 | Gillet | Aug. 4, 1942 |
| 2,293,822 | Haven | Aug. 25, 1942 |
| 2,512,455 | Alexander | June 20, 1950 |